United States Patent [19]

Tanaka

[11] 4,336,305
[45] Jun. 22, 1982

[54] CERAMIC THROW-AWAY TIPS AND PROCESS FOR PRODUCING THE SAME

[75] Inventor: Hiroshi Tanaka, Aichi, Japan

[73] Assignee: NGK Spark Plug Co., Ltd., Aichi, Japan

[21] Appl. No.: 103,134

[22] Filed: Dec. 13, 1979

[30] Foreign Application Priority Data

Dec. 19, 1978 [JP] Japan ................................ 53-155804

[51] Int. Cl.³ ............................................ C23C 11/08
[52] U.S. Cl. ................................... 428/336; 423/324; 423/395; 423/625; 427/190; 427/255; 427/199; 428/446; 428/689; 428/698; 428/702

[58] Field of Search ............... 428/446, 538, 539, 334, 428/335, 336, 689, 698, 702; 427/190, 199, 255; 423/625, 324, 395

[56] References Cited

U.S. PATENT DOCUMENTS 3,914,473 10/1975 Hale .................................... 427/255

*Primary Examiner*—Marion McCamish
*Attorney, Agent, or Firm*—Sughrue, Mion, Zinn, Macpeak and Seas

[57] ABSTRACT

A ceramic throw-away tip which comprises a hot-pressed sinter of $Si_3N_4$ on the surface of which is a thin coating of at least one of $Al_2O_3$ and AlON.

6 Claims, 2 Drawing Figures

CERAMIC THROW-AWAY TIPS AND PROCESS FOR PRODUCING THE SAME

BACKGROUND OF THE INVENTION

1. Field of the Invention

The present invention relates to ceramic throwaway tips and to a process for producing the same and provides disposable cutting tools comprising silicon nitride as a substratum having high flexural strength and excellent abrasion and shock resistance.

2. Description of the Prior Art

Sinters obtained by molding a finely divided powder of silicon nitride ($Si_3N_4$) containing a small amount of additives by hot-pressing are expected to be useful as high temperature materials because of their excellent heat resistance as described in U.S. Pat. Nos. 4,119,690 and 4,131,459. Further, these sinters have potential as cutting tools because of their excellent mechanical strength under high temperatures. However, they are not abrasion resistant. The edge of the tool easily undergoes brittle fracture and also its cutting force is high because the cutting edge dulls during the cutting process. As a result of these problems they have not been practical.

SUMMARY OF THE INVENTION

As a result of various studies to solve the above-described problems so as to utilize $Si_3N_4$ sinters having good heat resistance and high temperature strength in the field of cutting tools, it has been found that the abrasion resistance and shock resistance of the tools are improved if a thin film of dense fine particles of at least one of $Al_2O_3$ and AlON is formed on the surface of the $Si_3N_4$ sinters, by which a remarkably long cutting life can be obtained as compared with the prior ceramic tools.

The present invention is based on the above-described finding and provides ceramic throw-away tips which comprise a hot-pressed sinter comprising $Si_3N_4$ as the principal component, on the surface of which is a thin coating of at least one of $Al_2O_3$ and AlON.

Further, the present invention provides a process for producing ceramic throw-away tips which comprise forming a thin coating of at least one of $Al_2O_3$ and AlON by chemical vapor phase deposition on a substratum of a throw-away tip which is produced by hot-pressing a mixture prepared by adding a small amount of at least one sintering assistant selected from MgO, $Y_2O_3$, $Ta_2O_5$, $ZrO_2$ and $Al_2O_3$ to an $Si_3N_4$ powder.

DETAILED DESCRIPTION OF THE INVENTION

Figure 1:
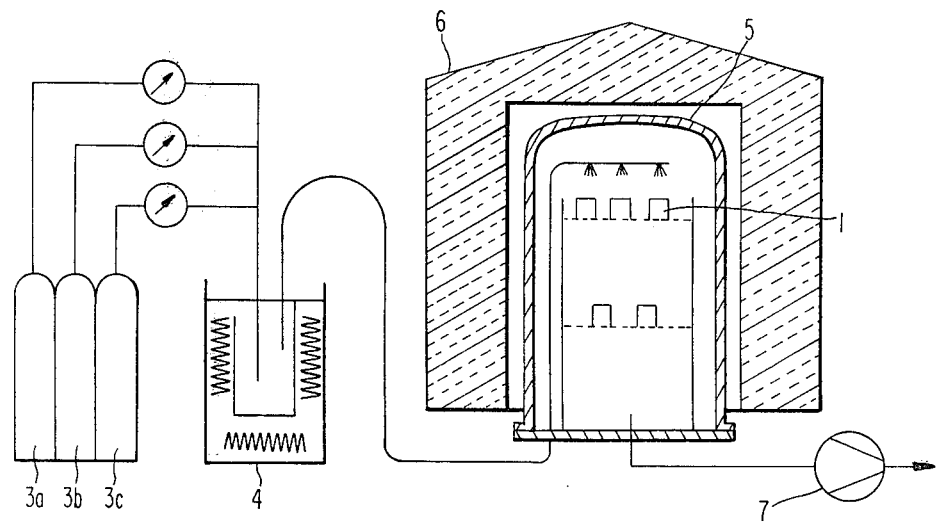
FIG. 1 is an illustration of the chemical vapor phase deposition apparatus (CVD apparatus).

The substratum of the throw-away tip is obtained by hot-pressing a powdery mixture (preferably prepared from powders having a purity of 99% or better and a particle size of about 1.5μ or less) prepared by adding a small amount of at least one sintering assitant selected from MgO, $Y_2O_3$, $Ta_2O_5$, $ZrO_2$ and $Al_2O_3$ typically in an amount of about 5% by weight to an $Si_3N_4$ powder. These sintering assistants are described in U.S. Pat. Nos. 4,119,690 and 4,131,459. Hot pressing is carried out at about 1,650° to 1,800° C. and 200 kg/cm² or more and preferably 400 kg/cm² or more pressure. The resulting substratum of the throw-away tip has excellent high temperature strength. In the flexural strength test, which is a criterion for ascertaining mechanical strength carried out in Example 1 below, the substratum had a flexural strength over 80 kg/cm². On the other hand, $Al_2O_3$ ceramic sinters generally have a flexural strength of about 30 to 70 kg/cm².

It is important that the substratum of the throw-away tip after hot-pressing does not substantially contain pores. The pore volume is controlled by adjusting the hot pressing conditions within the above ranges. If the hot pressing temperature is too low, many pores remain and if the pore volume exceeds about 1.0% by volume, it cannot be used as a cutting tool because its fatigue strength deteriorates. On the other hand, if the temperature is too high, $Si_3N_4$ decomposes to create pores.

After the resulting substratum of the throw-away tip is abraded to form the desired shape, a thin coating of at least one of $Al_2O_3$ and AlON is formed on the surface thereof by a chemical vapor deposition process (CVD process) such as described in U.S. Pat. No. 2,962,388.

In the case of forming a thin coating of $Al_2O_3$, the substratum of the throw-away tip is put in a reactor. After heating to about 1,000° to 1,100° C. at a pressure of 1 atm or less, gases of $AlCl_3$, $CO_2$ and $H_2$ are introduced into the reactor to induce a deposition reaction such as the reaction of equation (1):

$$2AlCl_3 + 3CO_2 + 3H_2 \rightarrow Al_2O_3 + 6HCl + 3CO \qquad (1)$$

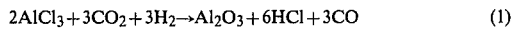

on the surface of the substratum of the throw-away tip by which a thin coating layer of $Al_2O_3$ is formed.

In the case of forming a thin coating of AlON, gases of $AlCl_3$, $CO_2$, $H_2$ and $N_2$ are introduced into the reactor after heating, by which a thin coating of AlON is formed on the surface of the substratum of the throw-away tip by a deposition reaction represented by equation (2):

$$2AlCl_3 + 2CO_2 + 3H_2 + N_2 \rightarrow 2AlON + 6HCl + 2CO \qquad (2)$$

It is also possible to form a thin coating layer composed of $Al_2O_3$ and AlON on the surface of the throw-away tip by changing the composition of the gas mixture introduced into the reactor during the coating step.

The $Al_2O_3$ and AlON forming the thin coating layer are preferred to have a particle size of 1 μm or less and a relatively small pore volume (e.g., about 1% by volume or less). If the particle size exceeds 1 μm, the pores easily form and cause a deterioration of the strength of the thin coating layer.

Further, if the thickness of the thin coating layer is less than about 3 μm, abrasion resistance is improved little but if it is about 3 μm or more, excellent properties are obtained. However, in the case of a coating more than 20 μm thick, a long production time is required which presents the disadvantage of high cost. If the treating temperature is increased to shorten the treatment time grain growth is accelerated which in turn deteriorates the strength of the thin coating. Accordingly, a preferred thickness is about 3 to 20 μm.

In the following, the present invention is illustrated in greater detail with reference to specific examples.

EXAMPLE 1

All powders used as raw materials were commercially available. To an $Si_3N_4$ powder (particle size 1 μm) (this powder is used in each of the examples), $Ta_2O_5$ (1.5 μm), $Y_2O_3$ (1.8 μm) and $Al_2O_3$ (0.9 μm) were added as shown in A and B of Table 1, and the mixture was milled in a ball mill using acetone. In this example, $Ta_2O_5$, $Y_2O_3$ and $Al_2O_3$ were used as the sintering assistants. However, similar results are obtained using MgO or ZrO as the sintering assistant. After the resulting powdery mixture was dried, it was filled into a graphite mold and subjected to hot-pressing at about 1,750° C. under 500 kg/cm² pressure for 30 minutes. Using the resulting sinter, a test sample for measuring flexural strength (4×8×25 mm) and a tip for cutting tests, namely a substratum of the throw-away tip (12.7□×4.8 t mm, corner R 0.8 mm, and 25°×0.1 mm) were produced.

Using the test sample for measuring flexural strength; flexural strength, hardness, and relative specific gravity for $Si_3N_4$ were measured. The results obtained are shown in Table 1.

TABLE 1

| Sub-stra-tum | Composition (% by weight) | | | | Flexural Strength (kg/mm²) | Hard-ness (45N) | Relative Specific Gravity |
| --- | --- | --- | --- | --- | --- | --- | --- |
| | $Si_3N_4$ | $Ta_2O_5$ | $Y_2O_3$ | $Al_2O_3$ | | | |
| A | 70 | 17.5 | — | 12.5 | 85 | 86.2 | 99.6 |
| B | — | — | 9 | 9 | 106 | 85.9 | 99.7 |

As is obvious from the results shown in the table, the substrata of the throw-away tips have high hardness and high density. Further, the flexural strength indicates excellent mechanical character.

Figure 2:
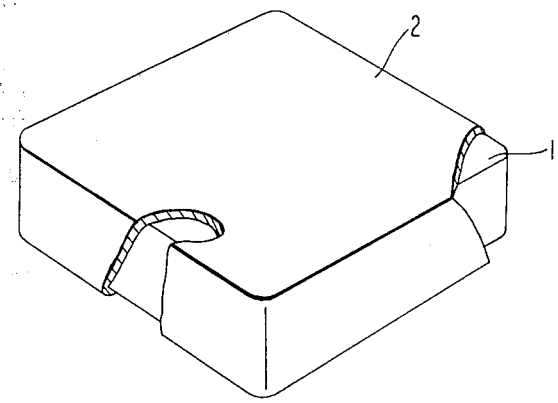
FIG. 2 is a plan showing the thin layer on the substratum of the throw-away tip.

On the surface of the substrata of the throw-away tips A and B shown in Table 1, a thin coating of $Al_2O_3$ was formed on tip A by means of the CVD apparatus shown in FIG. 1 and a thin coating of AlON and $Al_2O_3$ (respectively) were formed on separate B tips. In detail, the substratum of the throw-away tips (A or B) 1 was put in reactor 5 of a CVD apparatus. After heating to about 1,100° C. in a heating furnace 6, $H_2$, CO and $CO_2$ gases from gas cylinders (3a, 3b and 3c) were introduced as the gas mixture shown in Table 2 into the reactor 5 for 6 hours through an $AlCl_3$ evaporating device 4. The pressure of the reactor 5 in this case was kept at 50 Torr. Thus, a thin coating 2 of $Al_2O_3$ was formed on the surface of the substratum 1 of the throw-away tip, as shown in FIG. 2, by a deposition reaction according to the above-described reaction formula (1). In this case, a thin coating layer of $Al_2O_3$ having a thickness of 5 μm was obtained by treatment for 6 hours. These tips are hereafter designated $A_{Al_2O_3}$ and $B_{Al_2O_3}$.

Similarly, the substratum B of the throw-away tip was put in the reactor 5. After heating to 1,050° C., the gas mixture shown in Table 2 as b was introduced and the pressure of the reactor was kept at 30 to 50 Torr. In this case, a thin coating layer of AlON having a thickness of 3 μm was obtained by treatment for 4 hours. This tip is designated $B_{AlON}$.

TABLE 2

| Gas Composition | Composition of Gas Mixture (% by volume) | | | | |
| --- | --- | --- | --- | --- | --- |
| | $AlCl_3$ | CO | $CO_2$ | $H_2$ | $N_2$ |
| a | 8 | 30 | 3 | 59 | — |
| b | 10 | — | 13 | 42 | 35 |

The $Al_2O_3$ and AlON particle size of these coatings was 1 μm or less.

Using ceramic throw-away tips $A_{Al_2O_3}$ and $B_{Al_2O_3}$ produced by coating the surface of the substrata of the throw-away tips A and B with $Al_2O_3$ and $B_{AlON}$ produced by coating the surface of the substratum B with AlON, a cutting test on cast iron rods (FC 20) was carried out by cutting at a cutting depth of 1.0 mm, a feed rate of 0.31 mm/1 revolution, a cutting rate of 400 m/min and 200 m/min till flank abrasion $V_b$ became 0.4 mm. For comparison, the cutting test was carried out under the same condition using the substrata of the throw-away tips A and B which were not coated. The results of the tests are shown in Table 3.

TABLE 3

| | Life Time at a Cutting Rate of 400 m/min (minutes) | Life Time at a Cutting Rate of 200 m/min (minutes) |
| --- | --- | --- |
| Invention | | |
| $A_{Al_2O_3}$ | 145 | 190 |
| $B_{Al_2O_3}$ | 115 | 158 |
| $B_{AlON}$ | 106 | 142 |
| Comparison | | |
| A | 30 | 46 |
| B | 7 | 19 |

As is clear from Table 3, the abrasion resistance in the throw-away tips $A_{Al_2O_3}$, $B_{Al_2O_3}$ and $B_{AlON}$ according to the present invention is remarkably improved as compared with that in case of the substrata of the throw-away tips A and B which were not coated. Further, the decrease in cutting resistance can be removed, because it becomes difficult to cause brittle fracture of the edge and the edge becomes less dull during the cutting process.

As described above, the ceramic throw-away tips of the present invention have excellent characters as cutting tools, because of their remarkably improved abrasion resistance and shock resistance together with their high flexural strength as the inherent property of $Si_3N_4$.

While the invention has been described in detail and with reference to specific embodiments thereof, it will be apparent to one skilled in the art that various changes and modifications can be made therein without departing from the spirit and scope thereof.

What is claimed is:

1. A ceramic throw-away tip which comprises a hot-pressed sinter of $Si_3N_4$ on the surface of which is a thin coating of at least one of $Al_2O_3$ and AlON.

2. The ceramic tip of claim 1, wherein said coating is about 3 to 20 μm thick.

3. The ceramic tip of claim 1, wherein said hot pressed sinter is hot pressed at about 1,650° to 1,800° C. and at least 200 kg/cm² pressure.

4. The ceramic tip of claim 1, wherein said coating is formed of particles having a particle size less than about 1 μm.

5. The ceramic tip of claim 1, wherein said coating is formed by chemical vapor deposition.

6. A process for producing ceramic throw-away tips which comprises forming a thin coating layer of at least one of $Al_2O_3$ and AlON by chemical vapor deposition on a substratum of a throw-away tip which is produced by hot-pressing a mixture of a small amount of at least one sintering assistant selected from MgO, $Y_2O_3$, $Ta_2O_5$, $ZrO_2$ and $Al_2O_3$ and an $Si_3N_4$ powder.

* * * * *